United States Patent
Brown et al.

(10) Patent No.: US 9,464,913 B2
(45) Date of Patent: Oct. 11, 2016

(54) ASSISTIVE VEHICULAR GUIDANCE SYSTEM AND METHOD

(71) Applicant: Jaybridge Robotics, Inc., Cambridge, MA (US)

(72) Inventors: Jeremy Brown, Somerville, MA (US); Jeremy Nimmer, Acton, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

(21) Appl. No.: 15/004,069

(22) Filed: Jan. 22, 2016

(65) Prior Publication Data

US 2016/0238403 A1   Aug. 18, 2016

Related U.S. Application Data

(60) Provisional application No. 62/116,792, filed on Feb. 16, 2015.

(51) Int. Cl.
  *G05D 1/00* (2006.01)
  *G01C 21/36* (2006.01)
(52) U.S. Cl.
  CPC ....... *G01C 21/3629* (2013.01); *G01C 21/3632* (2013.01)
(58) Field of Classification Search
  None
  See application file for complete search history.

(56) References Cited

U.S. PATENT DOCUMENTS

| | | | |
|---|---|---|---|
| 7,139,651 B2 | 11/2006 | Knowlton et al. | |
| 8,095,248 B2 | 1/2012 | Rottig et al. | |
| 8,583,361 B2 | 11/2013 | Lewis et al. | |
| 8,816,883 B2 | 8/2014 | Rottig et al. | |
| 9,046,371 B2 | 6/2015 | Casson et al. | |
| 9,157,754 B2 | 10/2015 | Lewis et al. | |
| 2005/0222933 A1 | 10/2005 | Wesby | |
| 2006/0207822 A1 | 9/2006 | Taylor | |
| 2012/0290178 A1 | 11/2012 | Suzuki et al. | |
| 2013/0054133 A1 | 2/2013 | Lewis et al. | |

FOREIGN PATENT DOCUMENTS

WO   2004104520 A1   12/2004

OTHER PUBLICATIONS

International Search Report PCT/US16/14853 dated Jun. 3, 2016.
International Application No. PCT/US2016/014853, Invitation to Pay Additional Fees mailed Mar. 22, 2016, 2 pgs.

*Primary Examiner* — Adam Tissot
*Assistant Examiner* — Paul Castro
(74) *Attorney, Agent, or Firm* — Chetlin IP, P.C.

(57) ABSTRACT

An assistive vehicular guidance system for locating a spotter vehicle in a target location near a target machine. The guidance system has a positioning system including global positioning sensors on the spotter vehicle and target machine, and user interfaces providing visual and/or auditory cues. An assist module includes long-range and short-range network radios and an analyzer. The analyzer interfaces with the global positioning sensors, the long-range and short-range network radios, and the user interfaces, planning a path for the spotter vehicle and providing cues in guiding the spotter vehicle along the path to the target location. A communications system includes short-range and long-range networks, the short-range network connecting the short-range network radios of the spotter vehicle and the target machine. The long-range network includes a VPN and server, connecting the long-range radios of the spotter vehicle and target machine with the server via the VPN.

20 Claims, 6 Drawing Sheets

ASSISTIVE VEHICULAR GUIDANCE SYSTEM AND METHOD

CROSS-REFERENCE TO RELATED APPLICATIONS

The invention claims the benefit of, and priority to, U.S. Provisional Patent Application, Ser. No. 62/116,792 filed Feb. 16, 2015, the complete subject matter of which is incorporated herein by reference.

FIELD OF THE INVENTION

The present invention relates to loading a vehicle from a proximate work machine. More specifically, it relates to aligning a truck with a shovel for loading.

BACKGROUND OF THE INVENTION

Mining operations involve moving and operating large vehicles, including mining trucks and shovels. Shovels remove from a pit overburden and ore or coal which is then loaded into trucks for transport and further processing. Spotting is the process of aligning a truck with or under a shovel to receive material from the shovel. Moving such large vehicles is conventionally a time-consuming process due to safety concerns and difficulties in navigating while driving and/or parking the trucks in close proximity to the shovel and its moving bucket. Therefore, spotting may be a source of inefficiency in the load-haul-dump cycle, involving difficult and/or dangerous maneuvers.

BRIEF SUMMARY OF THE INVENTION

One aspect of the present invention provides in an embodiment an assistive vehicular guidance system to locate at least one spotter vehicle in a target location near a target machine, comprising: a positioning system comprising global positioning sensors located on each of the spotter vehicle and target machine; an operator interface for the target machine, the target machine operator interface configured to provide at least visual cues; an operator interface for the spotter vehicle, the spotter vehicle operator interface configured to provide at least specific auditory cues; an assist module for each of the spotter vehicle and target machine, the assist module comprising a long-range network radio, a short-range network radio and an analyzer, the analyzer being configured to interface with the global positioning sensors, the long-range-network radio, the short-range network radio, the target machine user interface and the spotter vehicle operator interface to plan a path for the spotter vehicle to follow to the target location and to provide at least specific auditory cues to aid a spotter vehicle operator in guiding the spotter vehicle to the target location along the path; and a communications system comprising a short-range network and a long-range network, short-range network being configured to connect the short-range network radio of the spotter vehicle with the short-range network radio of the target machine, and the long-range network comprising a virtual private network and a central server, the long-range network being configured to connect the long-range radios of the spotter vehicle and target machine with the central server via the virtual private network.

Another embodiment of the present invention includes a method for assisting an operator in guiding a spotter vehicle to a target location in proximity to a target machine, comprising the steps of: activating a vehicular assist guidance system comprising a positioning system, a user interface for at least the spotter vehicle, the user interface comprising a display with a video feature and an auditory feature, a communications system comprising, and a processor, the processor being operatively associated with the positioning system and the user interface and the communications system being configured to communicate information processed between the processor of the spotter vehicle and the target machine; moving the spotter vehicle into a queue location; via the processor, determining whether a path can be planned from the queue location to the target location, using the user interface, confirming that the processor has planned the path; via the processor and the communications system, causing the path to be displayed on the display; after the confirming, causing the spotter vehicle to move into reverse gear; by causing the spotter vehicle to move into reverse gear, automatically causing the visual display feature to be disabled, leaving the auditory feature operative, and providing auditory cues; using the auditory cues to steer the spotter vehicle to follow the path to the target location; and stopping the spotter vehicle at the target location to await action from the target machine.

BRIEF DESCRIPTION OF THE DRAWINGS

Illustrative and presently preferred exemplary embodiments of the invention are shown in the drawings in which.

DETAILED DESCRIPTION OF THE INVENTION

Figure 1:
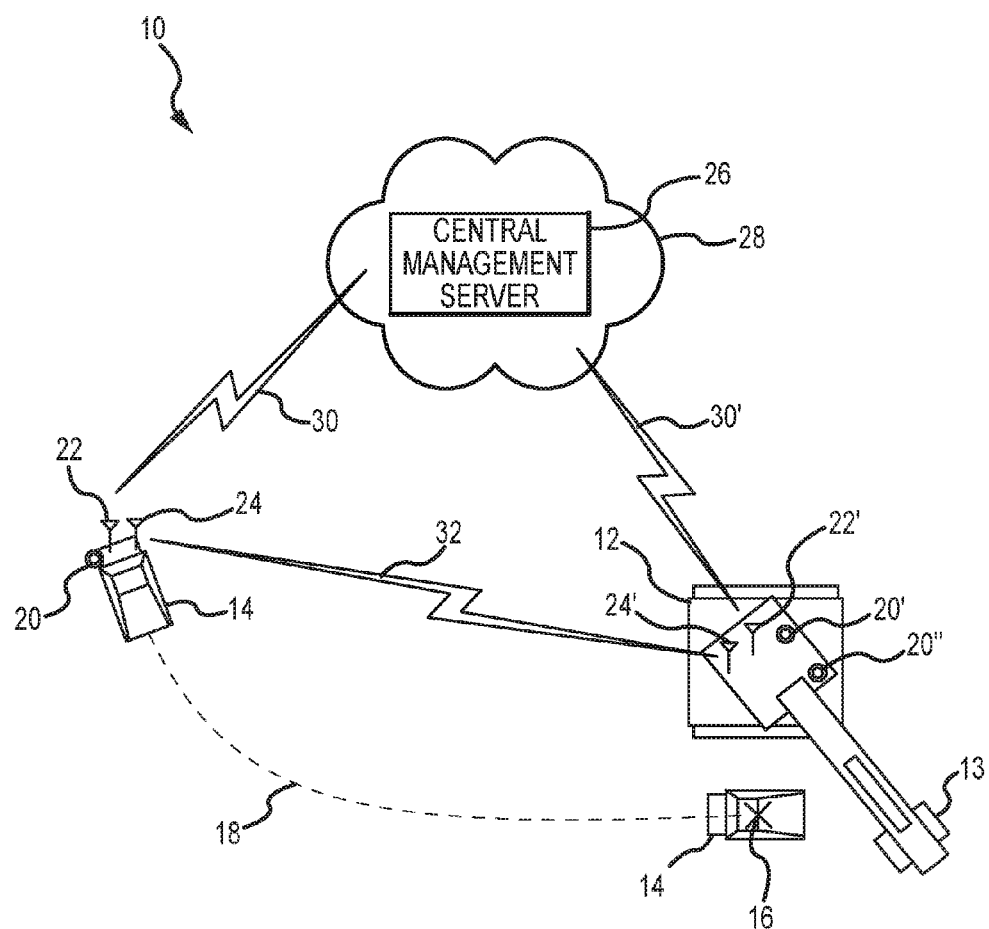
FIG. 1 is a plan view of an assistive vehicular guidance system according to one embodiment of the invention.

The present invention comprises embodiments of spotting assist system 10 and method 100 to accurately position a spotter vehicle (e.g., bed of haul truck 14) into a target location 16 under shovel bucket 13 of shovel 12 (e.g., electric rope shovel, hydraulic shovel, wheel loader or other loading apparatus).

In spotting, an operator of truck 14 must align the bed of truck 14 substantially near and under bucket 13 of shovel 12 to receive a load of material from shovel bucket 13, while reducing spillage of material during the transfer and avoiding collisions with shovel 12 from either backing into the shovel 12 during the spotting process or being hit by shovel bucket 13 as it pivots. Accidents may occur or respotting may be necessary due to limited visibility and/or lack of operator capability. If an operator requires multiple attempts to properly spot the truck under the shovel, time and fuel may be wasted during the re-spotting process. Further, shovel 12 may wait (hang) while truck 14 gets into position, which is inefficient.

Embodiments of system 10 and method 100 assist the human operator of the spotter vehicle (e.g., truck 14), using auditory cues and a visual display (e.g., spotter display 46) to quickly, reliably, and accurately position the spotter vehicle (e.g., bed of truck 14) in target position 16, which, in embodiments discussed herein, aligns with the position shovel bucket 13 occupies when it swings into place for loading truck 14. By assisting the operator in controlling and guiding the truck 14, while simultaneously allowing the operator to remain in complete control of the truck 14, system 10 and method 100 provide spotting assist system 10 that is simpler, more robust, and easier to integrate with existing vehicle platforms than a fully autonomous spotting system with autonomous control of truck 14. Advantageously, embodiments of system 10 may be loosely integrated with shovel 12 and truck 14. Aside from components that are rigidly attached in appropriate locations and the connection to a source of electrical power, embodiments of system 10 require no other mechanical or electrical coupling to shovel 12 and truck 14. Thus, embodiments of system 10 and method 100 may be used in new, as well as retrofit applications, over a wide-range of platforms, quickly and with less development effort than that required for a tightly integrated system.

In embodiments discussed herein, the spotter vehicle comprises truck 14 and the target comprises bucket 13 of shovel 12 when it swings into target position 16 in the specific context of open pit mining operations. However, the present invention should not be viewed as being limited in that respect. As would be appreciated by one of skill in the art after becoming familiar with the teachings of the present invention, system 10 and method 100 may be used in any situation where a human operator must repeatedly and repeatably move a vehicle to a specific position with respect to another vehicle, piece of machinery or other target. Such a task arises in a diverse set of applications, including aggregate handling (mining, quarry operation), agriculture (grain transport to/from a silo), transportation (parking aircraft at a gate) and the like. Embodiments of the invention also apply to marine surface scenarios, such as guiding a boat to a dock.

Embodiments discussed hereafter comprise shovel 12 and truck 14, with only one shovel 12 and one truck 14; however, the invention should not be viewed as being limited in this respect either as embodiments may comprise multiple shovels 12 and trucks 14, in which the trucks 14 take turns spotting shovels 12, coordinating and sequencing the concurrent approach to multiple shovels 12. In addition, a single shovel 12 (with a single assist module 42' as discussed below) may enable multiple trucks 14 to be positioned around or proximate shovel 12, as shown in an embodiment described in FIG. 3.

System 10 will now be described principally with reference to FIGS. 1-3. System 10 comprises a high-accuracy positioning system, an operator interface for each of truck 14 and shovel 12, assist module 42, 42' for each of truck 14 and shovel 12 and a communications system providing for receiving and transmitting information between truck 14 and shovel 12 in the manner described in more detail below to allow the operator of truck 14 to correctly position shovel bucket 13 in target location 16 repeatedly and repeatably.

Figure 2:
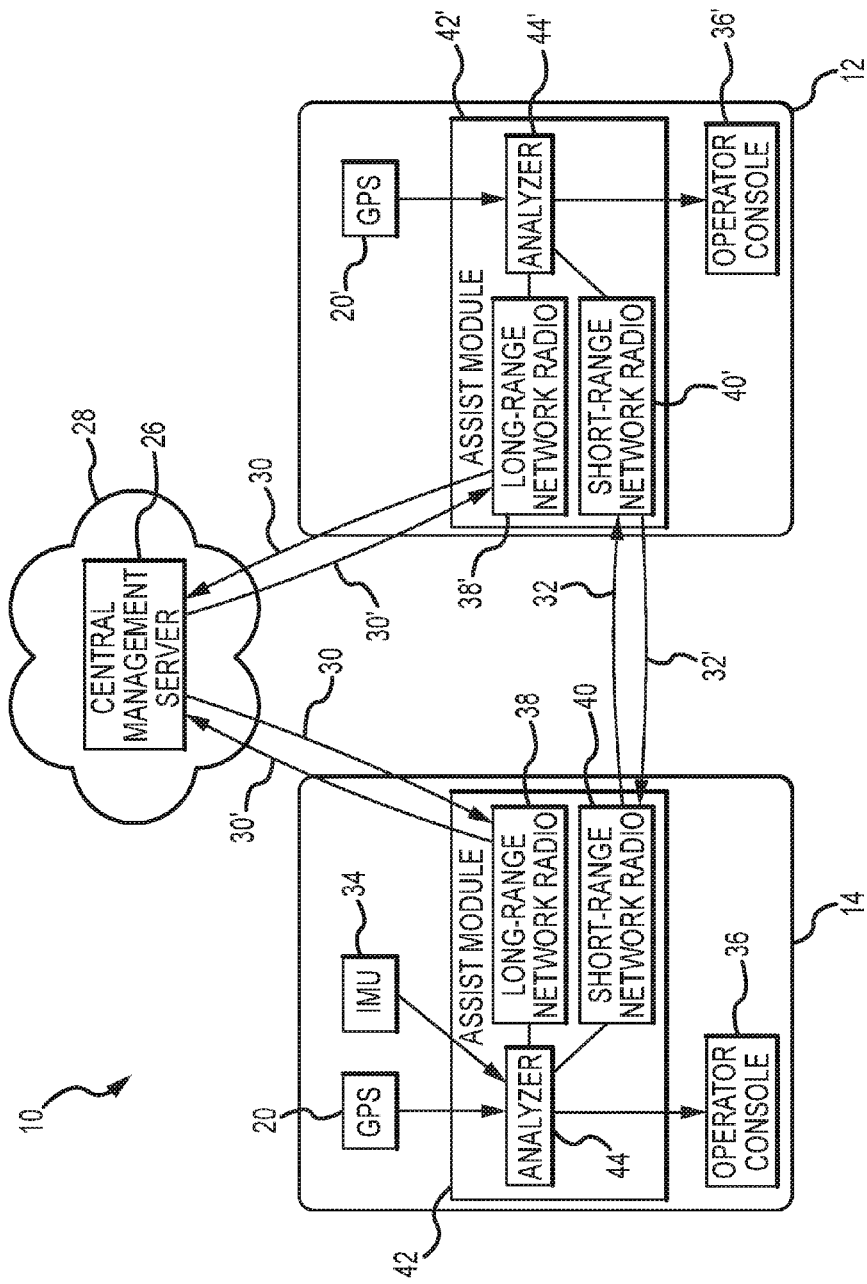
FIG. 2 is a block diagram illustrating the components of an embodiment of the assistive vehicular guidance system of the present invention.
Figure 3:
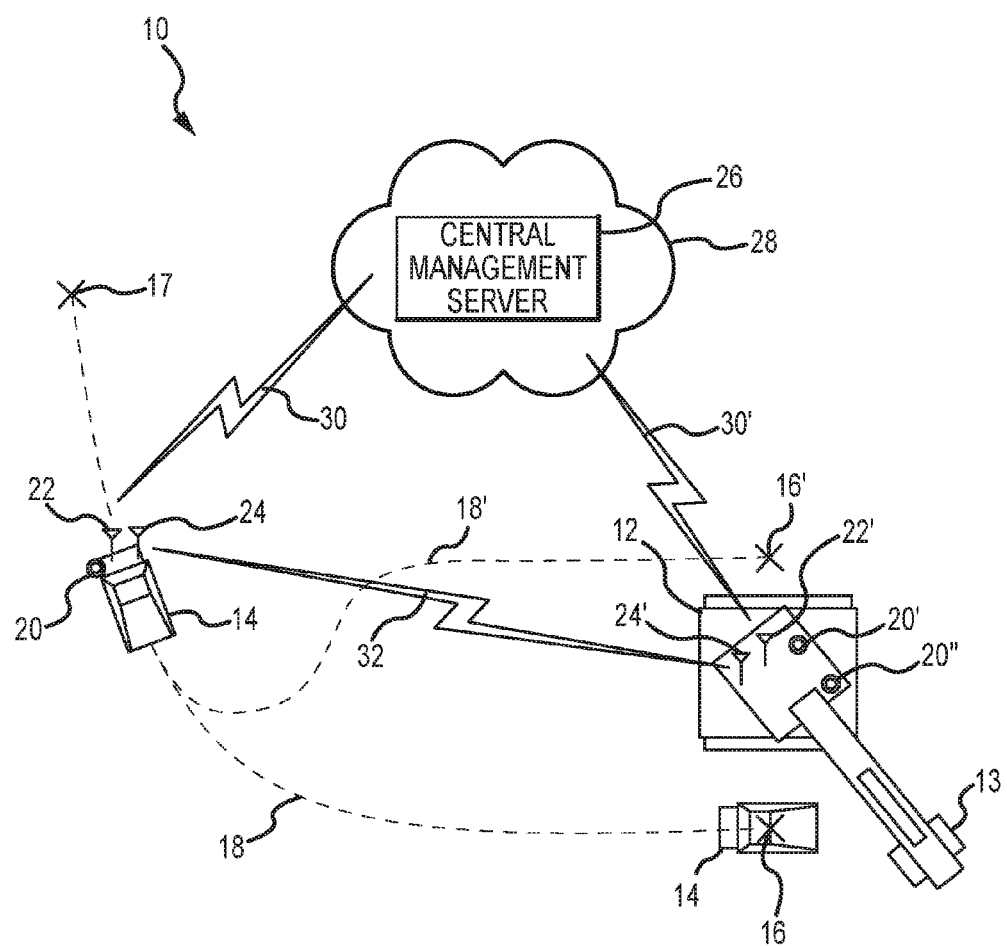
FIG. 3 is a plan view of an assistive vehicular guidance system according to an embodiment of the invention including a plurality of spotter vehicles and a plurality of planned paths.

As shown in FIGS. 1-3, the positioning system comprises at least one global positioning system (GPS) sensor 20 on truck 14 and at least one GPS sensor 20' on shovel 12 for determining position; shovel 12 may be equipped with GPS sensor 20" and/or additional sensors that may be located, for example, on the swing-arm of shovel 12 which carries bucket 13. Such sensors 20, 20', 20" may also be used to determining heading. In embodiments shown in FIGS. 1-3, the positioning system of system 10 comprises inertial measurement unit (IMU) 34 located on truck 14. Thus, embodiments are contemplated in which the positioning system may operate alone or in conjunction with IMU 34 and IMU sensors, enabling calculating the relative positions, orientations, velocities and/or yaw rate information of truck 14. Data from GPS sensors 20, 20' and 20", along with vehicle body configuration, and other geo-location information may be used to determine target location 16, the relative geopositions of truck 14 and shovel 12, and a safe, efficient planned path 18 for the operator of truck 14 to follow to reach target location 16 proximate shovel 12, as assisted according to embodiments of the present invention, when a straight line path may not be efficient or available. GPS sensors 20, 20', 20", as well as IMU 34, are in communication with and are operatively associated with a processor or analyzer 44, 44'.

System 10 further comprises an operator interface for each of truck 14 and shovel 12. As is explained in more detail below, in an embodiment, truck operator interface or console 36 comprises spotter display 46 with visual cues (e.g., steering light bar 50, distance bar 52) and auditory cues. Shovel operator interface or console 36' comprises target display 48. See FIGS. 4 and 5. As shown in FIG. 2, operator consoles 36, 36' comprise graphical user interfaces (GUIs) in communication with and operatively associated with analyzer 44, 44'. Operator consoles 36, 36' may comprise a tablet computer, smart phone, personal computer or other mobile device configured to permit the operator of truck 14 or shovel 12 to transmit and receive information, data and instructions from shovel 12 or truck 14, or both.

Again with reference to FIGS. 1-3, each of truck 14 and shovel 12 are equipped with an assist module 42, 42'. In embodiments shown, assist modules 42, 42' comprise long-range radio 38, 38', short range radios 40, 40' and analyzers 44, 44'.

Analyzers 44 and 44' are in communication with and are operatively associated with short-range 40, 40' and long-range radios 38, 38', operator consoles 36, 36' (through which they receive and transmit information and instructions to and from operators of truck 14 and shovel 12) and the positioning system (e.g., GPS sensors 20, 20', 20" and IMU 34). As is explained in more detail below, with the information and data it receives, analyzer 44, 44' plans planned path 18 for truck 14 to follow to target location 16 and provides specific auditory cues, as well as visual cues in the appropriate circumstance, to aid the operator of truck 14 to guide truck 14 to target location 16 along planned path 18.

Analyzer 44, 44' may comprise at least one conventional processor or microprocessor equipped with the necessary hardware and software that interprets and executes a set of program instructions, and computer readable storage medium or memory having the program instructions embodied therewith or stored thereon. The computer readable storage medium or memory may be a RAM, ROM, static storage device such as magnetic or optical recording media and corresponding drive or another type of dynamic storage device that stores information and the program instructions (including specific path planning algorithms) for execution by the processor or microprocessor to analyze the data provided by GPS sensors 20, 20', IMU and/or IMU sensors 34 and construct the necessary feedback to plan and update planned path 18 for the truck operator via operator console 36, as well as shovel operator via operator console 36'. In one embodiment, although the software and hardware for analyzers 44, 44' may be substantially the same, the software may be programmed to execute different instructions stored in memory depending on the specific function of analyzer 44, 44'. Thus, analyzer 44 would automatically execute instructions to analyze sensor data and plan path 18 for use by truck 14, as well as transmission to analyzer 44' and shovel 12, as explained below.

System 20 further comprises a communications system. In the embodiments shown in FIGS. 1-3, the communications system of the present invention comprises two wireless networks—a short-range network and a long-range network. The communications system of the present invention is configured to switch communications between the short-range and long-range networks depending on which networks are available and operative given the condition of any truck 14 and/or shovel 12.

The short-range network of the present invention permits direct communication between short-range network radio 38 of truck 14 and short-range network radio 38' of shovel 38. In an embodiment shown in FIG. 2, the short-range network comprises an adhoc wifi network over which assist modules 40, 42' exchange data; however, the invention should not be viewed as being limited to an adhoc wifi network. As one of ordinary skill in the art would appreciate after becoming familiar with the teachings of the present invention, any suitable short-range network may also be used. The short-range network may be used to transmit data over the short-range network connection 32, 32' between shovel 12 and truck 14 using short-range network antennas 24, 24'.

Since not all stations can "see" one another at a given time, because of line-of-sight issues, for example, the long-range network may provide an alternate means of communication. Where stations are within radio range they can communicate; and continuously exchanging telemetry data with one another. Thus, if the short-range network is not available, the long-range network may be used.

The long-range network of system 10 comprises central virtual private network (VPN) 28 and central server 26. The long-range network is configured to connect long-range radio networks 38, 38' to central server 26 via long-range network antennas 22, 22', central VPN 28 and long range network connections 30, 30', such as via cell modem, for example. Again, the present invention should not be viewed as being limited in this respect. Thus, when using the long-range network, truck 14 may communicate with shovel 12, but only by going through central server 26. In one embodiment of the present invention, system 10 relies on the long-range network, without resort to the short-range network. The long-range network can connect all required aspects of system 10, including truck 14 and shovel 12, albeit through central server 26, but at lower bandwidth and higher latency, than when using the combination of long-range and short-range networks described above.

The central VPN 28 includes central server 26 communicating with shovel 12 and trucks 14. Central sever 26 may be located anywhere, either locally or remotely. More specifically, central server 26 may be located in a central command center, in the field, in another station, and the like. Alternatively, central server 26 may be a cloud-based server (i.e., located remotely from the site). Central server 26 may combine one or more of hardware, software, firmware, and system-on-a-chip technology to implement the central VPN 28. Central server 26 may include at least one conventional processor or microprocessor that interprets and executes a set of program instructions; and computer readable storage medium or memory having the program instructions embodied therewith or stored thereon. The computer readable storage medium or memory may be a random access memory (RAM), read only memory (ROM), static storage device such as magnetic or optical recording media and corresponding drive or another type of dynamic storage device that stores information and the program instructions for execution by the processor or microprocessor. The computer readable storage medium or memory storage device store the set of program instructions detailing embodiments of method 100 that when executed by one or more processors or microprocessors cause the one or more processors or microprocessors to perform various steps of method 100.

Although data may not be sent as quickly over the long-range network as the short-range network, the data will be transmitted over the long-range network if the short-range network is unavailable. Both truck 14 and shovel 12 broadcast telemetry data to each other over both networks (but at a reduced rate over the long-range network link). The short-comings of each wireless network are complementary. While both types of networks transmit telemetry data, the long-range network does not handle telemetry data as well as the short-range network; however, telemetry data is not required unless the stations (e.g., truck 14 and shovel 12) are at close range, and, in that case, the short-range network will work. When line-of-sight issues or other issues interfere with operation of the short-range network, the long-range network will function to transmit general status, because general status packets are at a high level and are not sent very frequently.

Operation of embodiments of system 10 will now be described with specific reference to FIGS. 4 and 5, which illustrate operator consoles 36' and 36, which comprise target display 48 and spotter display 46, respectively, both of which function as interfaces or GUIs. Target display 48 and spotter display 46 include map 58, which indicates the relative positions and orientations of truck 14 and shovel 12, vis-à-vis each other, target position 16 and planned path 18. As discussed in more detail below, map 58 is drawn using the location of shovel 12 (e.g., target location 16) and planned vehicle path 18 as its static reference frame, allowing both operators to better understand the progress of truck 14 in the spotting task with respect to the target location 16 proximate shovel 12.

Figure 4:
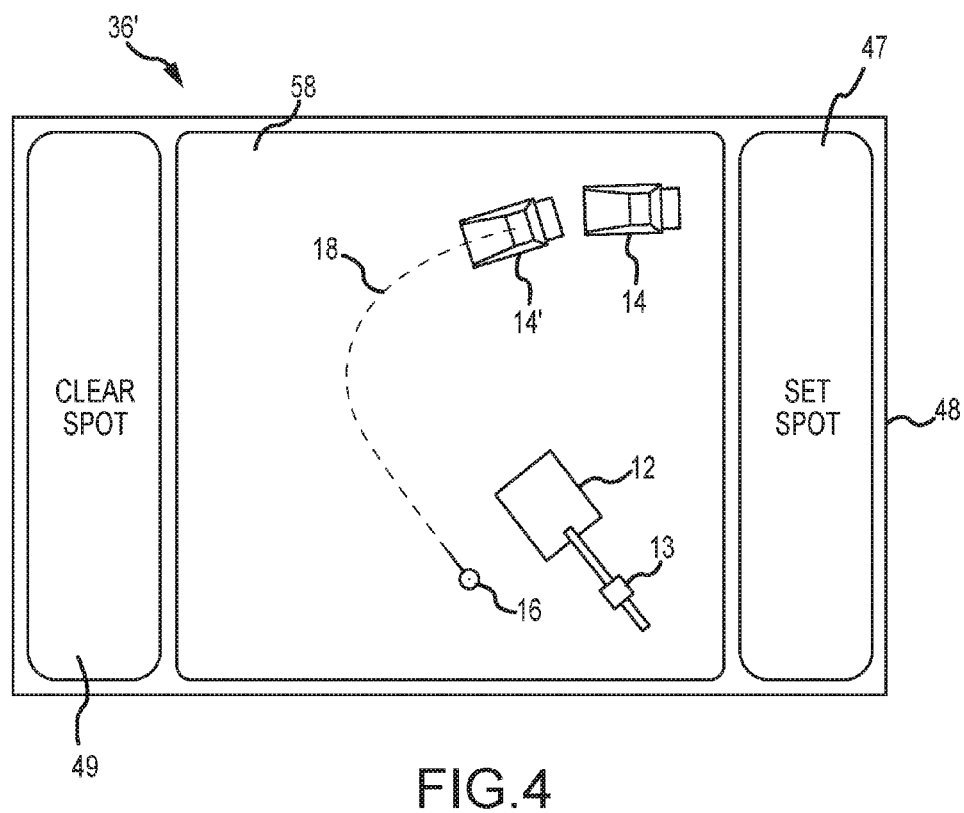
FIG. 4 is a pictorial representation of a graphical user interface for the operator of a target machine according to an embodiment of the present invention.
Figure 5:
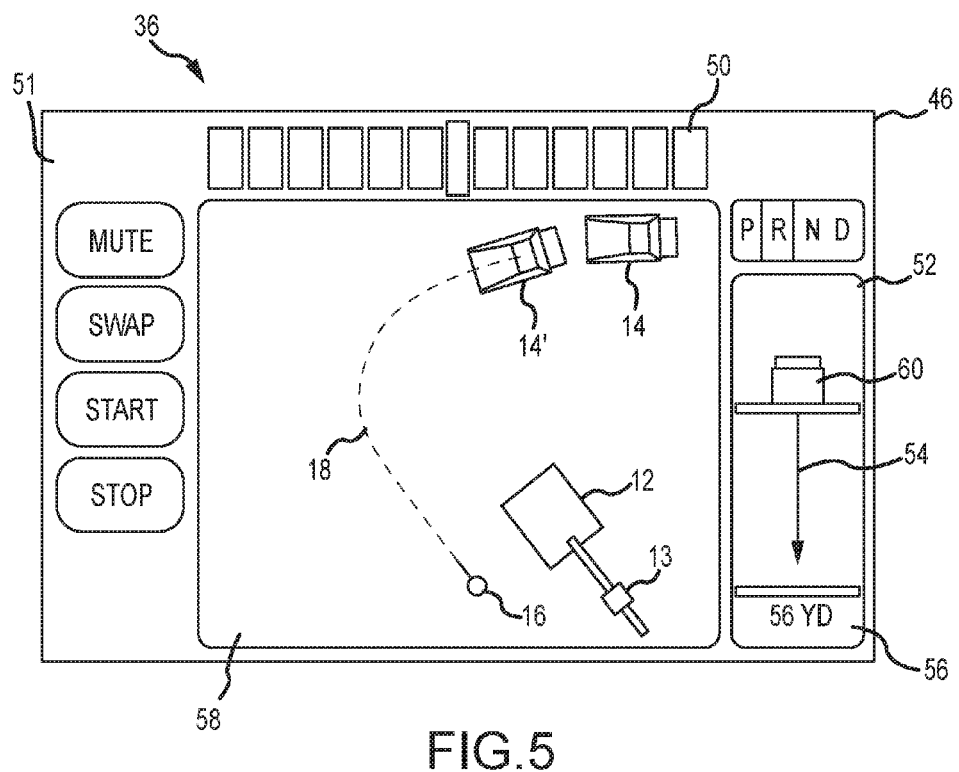
FIG. 5 is a pictorial representation of a graphical user interface for the operator of a spotter vehicle according to an embodiment of the present invention.

More specifically, operator console 36' comprises target display 48 as shown in FIG. 4. In the embodiment shown, in addition to map 58, target display 48 includes set spot button 47 and clear spot button 49 for the shovel operator to use as part of various steps in method 100, as described below. Operator console 36 comprises spotter display 46, as shown in FIG. 5. In the embodiment shown, in addition to map 58, spotter display 46 includes light bar 50 to provide steering cues, distance bar 52 to provide cues for throttle, brake and gearing, and spotter control button 51 for the truck operator to use as part of various steps in method 100, as described in more detail below. Spotter display 46 and target display 48 need not be the same, and may display different information as shown in FIGS. 4 and 5, but the invention should not be viewed as being limited in this respect.

Operator console 36 comes into play as part of system 10 and method 100 when the truck operator activates system 10 via spotter control button 51 on spotter display 46. See FIG. 5. Truck 14's assist module 42 receives and continues to receive telemetry and status updates from the shovel 12 via the wireless network. When truck 14 stops within a predetermined distance of target location 16, such as at queue location 17 (FIG. 3), truck assist module 42 (via analyzer 44) will attempt to plan path 18 from its then current location (e.g., queue location 17) to the target location 16. In an embodiment, queue location 17 may be within about 75 meters from target location 16. If successful in planning planned path 18, analyzer 44 will inform the truck operator, via the operator interface 36 (e.g., spotter display 46), to put truck 14 in reverse and begin backing up toward shovel 12. If analyzer 44 is unable to plan a path, it will tell the truck operator to move forward until a path can be planned (e.g., planned path 18' in FIG. 3). In at least one embodiment, path planning is performed using Dubins curves, plus a lead-out to straighten planned path 18 so the Dubins curve does not establish a loop path around shovel 12. Further dynamic path planning uses a pure pursuit algorithm to determine a trajectory for the truck 14 which will keep it on planned path 18, 18'. If shovel 12 specifies multiple target locations 16, 16', the truck operator interface 36' (e.g., spotter display 46) may automatically select the most appropriate target location 16, 16' (e.g., by proximity), or may allow the truck operator to manually select the desired target location 16, 16'.

Assist module 42 also guides the operator in driving truck 14 along planned path 18 with visual cues from steering light bar 50 and distance bar 52, as well as auditory cues. In an embodiment, spotter display 46 is disabled (blanked) as soon as truck 14 is put in reverse gear or begins moving in reverse (when system 10 is activated), and the operator is guided using auditory displays alone. In another embodiment, the visual cues (e.g., steering light bar 50 and distance bar 52) may be disabled (blanked) when truck 14 is put in reverse gear. Disabling the display or portions thereof, eliminates a source of visual distraction and encourages the truck operator to watch the work area to maintain safe operation of truck 14, while listening to the guidance provided by the specific auditory cues. However, embodiments are contemplated in which the visual displays can be manually enabled during spotting for training or system evaluation purposes.

System 10 and method 100 use spotter display 46 and target display 48, as well as map 58 and light bar 50 and distance bar 52, in specific ways which may enhance the utility of the feedback they provide. Light-bar 50 displays curvature error—the discrepancy between the curvature of the actual trajectory of the spotting vehicle (e.g., truck 14) as it is being driven, and the curvature of a trajectory which would quickly bring and keep it on planned path 18. In an embodiment shown, distance bar 52 indicates the distance from truck 14 to shovel 12 along planned path 18 using a non-linear, logarithmic scale, which provides more detail and resolution as truck 14 gets closer shovel 12 and target location 16. As illustrated in FIG. 4, as truck 14 approaches target location 16, truck icon 60 moves closer to distance indicator 56 in direction of arrow 54. In addition, distance indicator 56 indicates an increasingly shorter distance (e.g., less than the 56 YD shown by way of example in FIG. 5).

As mentioned above, operator interface 36 also provides auditory cues and acts as the primary display during spotting assistance in an embodiment of the present invention. In the present invention, the inventors have recognized that auditory cues provide aural feedback for steering and driving (throttle/brake) so that the truck operator can look around while spotting instead of keeping his eyes focused on the visual spotter display 46. This allows for better situational awareness and, in turn, improved safety.

The sound for the specific auditory cues may be emitted via speakers built into the operator interface 36, or by external speakers attached to the console. When the console is implemented using a tablet computer for example, then the speakers of the tablet might be used. In other embodiments, separate speakers mounted inside the cab of the truck 14 may be used. In either case, the cues must be selected so that they are clearly audible in the environment of the spotting vehicle cab. In the instance of open-pit mining, for example, in which truck 14 is a large haul truck, the auditory cues must be distinguishable from the ever-present engine noise, environmental noise, and other machine-generated sounds intended to alert the driver to various operating conditions.

According to embodiments of the present invention, at least one of two different styles of auditory cues may be provided: non-verbal sound effects, such as repeated beeps or chirping tones, and continuous tones; and quasi-verbal sound effects, such as repeated short single words or word fragments.

As the inventors here have recognized, advantageously, steering feedback may be particularly effective with low-latencies. Thus, according to embodiments of system 10, short-duration chirping tones or quasi-verbal sounds used for steering are repeated with a frequency of at least 1 Hertz (Hz). A period of 600 milliseconds (ms) between cue onsets may be used; however, the interval between cue onsets may range from about 250 ms to about 1,000 ms. A numeric sign of the curvature error of the truck 14 trajectory may be reflected in either the direction of pitch change (of chirps) or the choice of quasi-verbal effect (e.g., "LEFT-LEFT-LEFT", "RIGHT-RIGHT-RIGHT"), or other suitable low-latency auditory cues. For quasi-verbal cues, the magnitude of the curvature error is reflected by changes in the prosody of the cues; higher magnitude errors will trigger auditory cues with a greater sense of urgency. For example, a first error may be indicated in a first decibel level and a second, more significant error, may be indicated at a decibel level that is higher than the first level and repeated with a shortened cue onset period. A third, neutral effect for each auditory scheme is used to indicate a small magnitude curvature error, e.g., when the operator is basically on shovel 12. Changes to indicate a first error and then a second, more significant error, may be signified by changes in stress and in voicing of vowels (e.g., LEFT v. LEEE-FFFTT!!), and other variations demonstrating increased urgency.

Another set of auditory cues, in either style described above, may be used to provide feedback on the speed of truck 14. One signifies that the truck 14 is travelling faster than the recommended speed (e.g., "SLOWER"), and another (e.g., "STOP") indicates that the truck 14 is close enough to target location 16 proximate shovel 12 with its current speed that the truck operator should begin braking.

A third set of cues, in either style described above, may be used to indicate proximity to target position 16 proximate shovel 12. The quasi-verbal version provides the remaining distance to the shovel 12 as several discrete milestones are passed (e.g., "TEN YARDS", "FIVE YARDS", "TWO YARDS", "ONE YARD").

The three sets of auditory cues (of either non-verbal or quasi-verbal variety), described above, are produced independently and simultaneously. This effectively delivers three distinct channels of data to the truck operator at the same time, allowing for lower latencies in the feedback. The human auditory system is adept at distinguishing separate auditory sources; different vocal sources may be used for each set of quasi-vocal cues, enhancing this separation ability.

Figure 6:
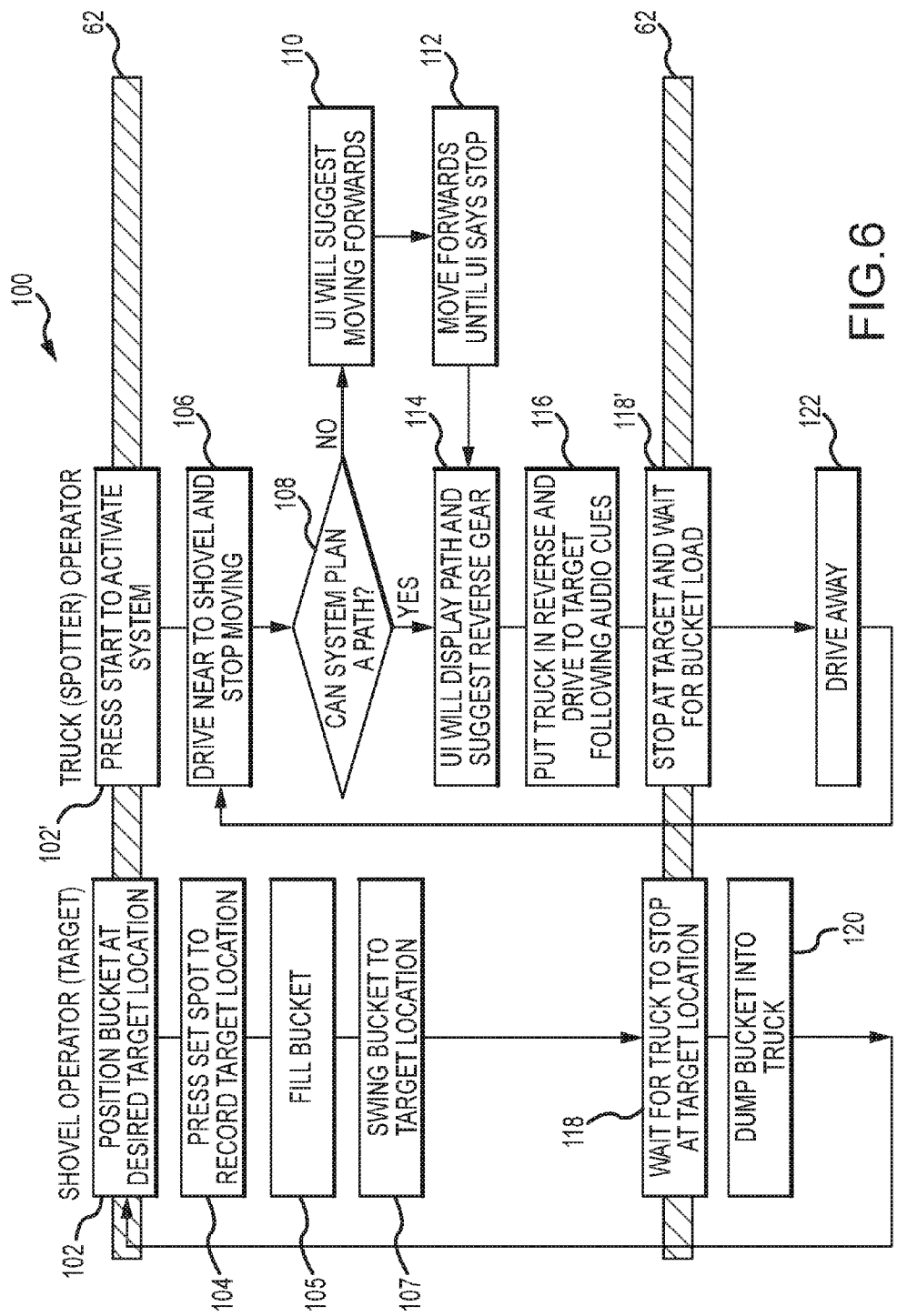
FIG. 6 is a flow chart of steps in the method of the present invention, according to one embodiment.

An embodiment method 100 of the present invention will now be discussed with reference to FIG. 6. As shown in FIG. 6, method 100 comprises various coordinated steps as between truck 14 and shovel 12, with bar 62 indicating steps that may occur at substantially the same time. In the embodiment shown, method 100 may begin by truck operator pressing the start button of spotter control panel 51 at step 102'; at substantially the same time (as shown by bar 62), shovel operator may begin positioning shovel bucket 13 at target location 16 in step 102. Geopositioning systems of shovel 12 and truck 14 begin measuring position/heading of each unit and broadcast this telemetry data to each other via the communications system. Target display 48 displays participating trucks 14, 14' on map 58 (FIG. 4), while each spotter display 46 (See FIG. 5) displays shovel 12.

As illustrated, the shovel operator pushes or selects "Set Spot" button 47 (See FIG. 4) to record target location 16 when that has been established at step 104. Alternatively, shovel operator may activate an "Auto Set" feature, so that the set spot feature is continually reset as the shovel 12 moves around. The truck operator drives proximate to shovel 12 and stops truck 14 (e.g., at queue location 17) at step 106. At step 108, stopping truck 14 causes truck assist module 42 to attempt to plan planned path 18 from truck 14's current location/orientation, which may be queue location 17, to target location 16 given orientation of shovel 12. If truck assist module 42 is unable to develop a path, then truck assist module 42 will indicate the lack of a spotting solution to the truck operator using visual and/or auditory means through spotter display 46. In another embodiment, this lack of a spotting solution may also be conveyed to the shovel operator in similar fashion through target display 48. Truck assist module 42 may then advise truck operator to move truck 14 forward through spotter display 46 at step 110. Then, truck 14 will move forward until the spotter display 46 (e.g., operator console 36) instructs truck 14 to stop at step 112. If planned path 18 is found, truck assist module 42 will advise the truck operator to put truck 14 into reverse and begin backing up along planned path 18 at step 114. Planned path 18 will be displayed on map 58 of both spotter display 46 (e.g., operator console 36) and target display 48 (e.g., operator console 36').

Once the truck 14 operator puts truck 14 into reverse and begins backing up at step 116, spotting assist feedback is turned on, including at least the auditory cues. In one embodiment, visual display capabilities of spotter display 46 are disabled so that the truck operator can look where truck 14 is going (without distraction from the visual display), being guided by the auditory cues, on the auditory and visual displays (e.g., spotter display 46, target display 48) (as may configured by operator according to embodiments of the present invention).

While the above steps are proceeding and at various other times as method 100 proceeds, the shovel operator may fill shovel bucket 13 at step 105 and swing bucket 13 into target location 16 at step 107. If the truck operator halts the truck 14 or begins moving forward and then halts, planned path 18 may be planned anew from truck 14 to shovel 12 and displayed to all participants in the manner previously described.

When the auditory cues indicate that truck 14 has reached the target location 16 proximate shovel 12 at step 118', truck 14 stops at target location 16 and waits to be loaded from bucket 13 of shovel 12. At substantially the same time (as indicated by bar 62), at step 118, shovel 12 waits for truck 14 to stop at target location 16. Shovel 12 loads truck 14 from bucket 13 is at step 120. Once truck 14 is loaded, it drives away at step 122.

At any point in the process where the then-target location 16 is no longer appropriate, the shovel operator may "unset" or remove target location 16 using Clear Spot button 49, effectively disabling operation of system 10. Circumstances in which it may be appropriate for the shovel operator to use Clear Spot button 49 would be if shovel 12 is moving, the operator decided to load on a different side of shovel 12, spotting was no longer needed, or target location 16 needed to be changed for any other reason.

Once truck 14 is loaded, the process may then be repeated continuously for various intervals, until interrupted for operational reasons, such as shift change, mine shutdown, equipment breakdown and the like.

Having herein set forth preferred embodiments of the present invention, it is anticipated that suitable modifications can be made thereto which will nonetheless remain within the scope of the invention, including all changes that come within the meaning and range of equivalents. The invention shall therefore only be construed in accordance with the following claims:

What is claimed is:

1. An assistive vehicular guidance system to locate at least one spotter vehicle in a target location near a target machine, comprising:
   a positioning system comprising global positioning sensors located on each of the spotter vehicle and target machine;
   an operator interface for the target machine, the target machine operator interface configured to provide at least visual cues;
   an operator interface for the spotter vehicle, the spotter vehicle operator interface configured to provide at least specific auditory cues;
   an assist module for each of the spotter vehicle and target machine, the assist module comprising a long-range network radio, a short-range network radio and an analyzer, the analyzer being configured to interface with the global positioning sensors, the long-range-network radio, the short-range network radio, the target machine user interface and the spotter vehicle operator interface to plan a path for the spotter vehicle to follow to the target location and to provide at least specific auditory cues to aid a spotter vehicle operator in guiding the spotter vehicle to the target location along the path and stopping the target vehicle at the target location to await further action from the target machine; and
   a communications system comprising a short-range network and a long-range network, short-range network being configured to connect the short-range network radio of the spotter vehicle with the short-range network radio of the target machine, and the long-range network comprising a virtual private network and a central server, the long-range network being configured to connect the long-range radios of the spotter vehicle and target machine with the central server via the virtual private network.

2. The assistive vehicular guidance system of claim 1, wherein the spotter vehicle user interface comprises a display with an auditory feature configured to provide the specific auditory cues.

3. The assistive vehicular guidance system of claim 1, wherein providing the specific auditory cues comprises providing at least one of type of steering cue, one type of speed cue and one type of proximity cue.

4. The method of claim 1, wherein providing the auditory cues comprises providing at least one type of quasi-verbal cue.

5. The assistive vehicular guidance system of claim 1, wherein the spotter machine user interface comprises a display with a visual feature configured to provide visual cues and an auditory feature configured to provide the specific auditory cues.

6. The assistive vehicular guidance system of claim 5, wherein the visual feature is configured to be disabled when the operator places the spotter vehicle in a reverse gear following the path, leaving the auditory feature operative to provide the specific auditory cues.

7. The assistive vehicular guidance system of claim 5, wherein the visual cues comprise a light bar configured to provide steering cues, a distance bar configured to provide operational cues and a map configured to provide positioning and orientation cues.

8. The assistive vehicular guidance system of claim 1, wherein the positioning system located on the spotter vehicle comprises an inertial measurement unit.

9. The assistive vehicular guidance system of claim 1, wherein the spotter vehicle is a truck and the target machine is a shovel, the shovel comprising a bucket configured to align with the target location.

10. The assistive vehicular guidance system of claim 1, wherein the communication system selects between the short range network and the long range network depending on network availability.

11. An assistive vehicular guidance system to locate at least one of a plurality of spotter vehicles in a target location near a target machine, comprising:
  a positioning system comprising global positioning sensors located on a target machine and each of the plurality of spotter vehicles;
  an operator interface for each of the spotter vehicles and the target machine, each of the operator interfaces comprising a display with a visual feature configured to provide visual cues and an auditory feature configured to provide auditory cues;
  an assist module for each of the spotter vehicles and target machine, the assist module comprising a long-range network radio, a short-range network radio and an analyzer, the analyzer for the spotter vehicles and the target machine comprising a computer program product having a computer readable storage medium embedded with program instructions executable by each analyser to interface with the global positioning sensors, the long-range network radio, the short-range network radio and the operator interface, and by the analyzer for the at least one spotter vehicle to plan a path for the at least one spotter vehicle to follow to the target location and to provide visual and auditory cues on the display to aid an operator in guiding spotter vehicle to the target location along the path and stopping the target vehicle at the target location to await further action from the target machine; and
  a communications system comprising a short-range network and a long-range network, the short-range network being configured to connect the short range network radio of the spotter vehicle with the short-range network radio of the target machine, and the long range network comprising a virtual private network and a central server, the central server comprising a computer program product comprising a computer readable storage medium having program instructions embodied therewith, the program instructions being executable by the central server operatively associated with the positioning system and the operator interfaces, the communications system being configured to communicate information processed between the processor of the spotter vehicle and the target machine and the long range network being configured to connect the long range radios of the spotter vehicle and target machine with the central server via the virtual private network.

12. The assistive vehicular guidance system of claim 11, wherein the visual display comprises a light bar configured to provide steering cues, a distance bar configured to provide operational cues, and a map configured to provide positioning and orientation cues.

13. The assistive vehicular guidance system of claim 11, wherein the visual feature is configured to be disabled when the spotter vehicle operator puts the spotter vehicle in reverse gear following the path, leaving the auditory feature operative to provide auditory cues.

14. The assistive vehicular guidance system of claim 1, wherein the analyzer of the at least one spotter vehicle planning the path for the at least one spotter vehicle to follow to the target location and providing visual and auditory cues on the display to aid the operator in guiding spotter vehicle to the target location along the path occurs automatically when said analyzer executes the program instructions.

15. The assistive vehicular guidance system of claim 11, wherein providing the specific auditory cues comprises providing at least one of type of steering cue, one type of speed cue and one type of proximity cue.

16. A method for assisting an operator in guiding a spotter vehicle to a target location in proximity to a target machine, comprising:
  activating a vehicular assist guidance system comprising a positioning system, a user interface for at least the spotter vehicle, the user interface comprising a display with a video feature and an auditory feature, a communications system comprising, and a processor, the processor being operatively associated with the positioning system and the user interface and the communications system being configured to communicate information processed between the processor of the spotter vehicle and the target machine;
  moving the spotter vehicle into a queue location;
  via the processor, determining whether a path can be planned from the queue location to the target location,
  using the user interface, confirming that the processor has planned the path;
  via the processor and the communications system, causing the path to be displayed on the display;
  after the confirming, causing the spotter vehicle to move into reverse gear;
  by causing the spotter vehicle to move into reverse gear, automatically causing the visual display feature to be disabled, leaving the auditory feature operative, and providing auditory cues;
  using the auditory cues to steer the spotter vehicle to follow the path to the target location; and
  stopping the spotter vehicle at the target location to await action from the target machine.

17. The method of claim 16, wherein providing the auditory cues comprises providing at least one type of non-verbal cue.

18. The method of claim 16, wherein the providing auditory cues comprises providing auditory cues with a frequency of at least one Hertz.

19. The method of claim 16, further comprising:
following the determining, using the user interface, conveying a notification that a path cannot be planned;
causing the spotter vehicle to move forward until, using the user interface, the processor confirms that the path can be planned.

20. The method of claim 16, wherein the action from the target machine is loading the spotter vehicle.

\* \* \* \* \*